(12) United States Patent
Pfefferle

(10) Patent No.: US 7,765,810 B2
(45) Date of Patent: Aug. 3, 2010

(54) METHOD FOR OBTAINING ULTRA-LOW NOX EMISSIONS FROM GAS TURBINES OPERATING AT HIGH TURBINE INLET TEMPERATURES

(75) Inventor: William C. Pfefferle, Madison, CT (US)

(73) Assignee: Precision Combustion, Inc., North Haven, CT (US)

( * ) Notice: Subject to any disclaimer, the term of this patent is extended or adjusted under 35 U.S.C. 154(b) by 1185 days.

(21) Appl. No.: 11/280,744

(22) Filed: Nov. 15, 2005

(65) Prior Publication Data

US 2008/0098745 A1 May 1, 2008

(51) Int. Cl.
*F02C 7/22* (2006.01)
*F02C 7/26* (2006.01)
(52) U.S. Cl. .......................................... 60/777; 60/723
(58) Field of Classification Search ................... 60/777, 60/39.822, 723, 39.52
See application file for complete search history.

(56) References Cited

U.S. PATENT DOCUMENTS

| 4,610,135 | A | * | 9/1986 | Alexander | 60/39.01 |
| 5,235,804 | A | * | 8/1993 | Colket et al. | 60/780 |
| 6,272,863 | B1 | * | 8/2001 | Pfefferle et al. | 60/723 |
| 6,748,745 | B2 | * | 6/2004 | Ul Karim et al. | 60/777 |
| 6,957,539 | B2 | * | 10/2005 | Lebas et al. | 60/772 |
| 7,007,487 | B2 | * | 3/2006 | Belokon et al. | 60/777 |
| 7,089,745 | B2 | * | 8/2006 | Roby et al. | 60/776 |
| 7,305,831 | B2 | * | 12/2007 | Carrea et al. | 60/772 |
| 2005/0028529 | A1 | * | 2/2005 | Bartlett et al. | 60/772 |
| 2008/0098738 | A1 | * | 5/2008 | Pfefferle | 60/746 |
| 2008/0120960 | A1 | * | 5/2008 | Agnew | 60/39.52 |
| 2008/0309087 | A1 | * | 12/2008 | Evulet et al. | 290/52 |

* cited by examiner

*Primary Examiner*—William H Rodriguez
(74) *Attorney, Agent, or Firm*—Robert L. Rispoli

(57) ABSTRACT

A method of lowered NOx combustion is taught wherein the kinetic rate of NOx formation is reduced for a given combustion temperature in a gas turbine combustor. A supply of fuel is provided along with a supply of ambient air in sufficient quantity to form a fuel/air mixture having an equivalence ratio greater than about 0.55 when mixed with the fuel. The fuel/air mixture is mixed with a supply of cooled combustion gases in sufficient quantity such that the oxygen content of the resulting air mixture is less than about 18 percent. The resulting air mixture is then passed into the combustor.

3 Claims, 3 Drawing Sheets

For EGR case the mixture is assumed to be, 15% O2, N2: 80%, CO2: 5%

METHOD FOR OBTAINING ULTRA-LOW NOX EMISSIONS FROM GAS TURBINES OPERATING AT HIGH TURBINE INLET TEMPERATURES

CROSS-REFERENCE

This application claims the benefit of PCT International Application No. PCT/US2004/017920 filed Jun. 4, 2004, which in turn claimed the benefit of U.S. Provisional Patent Application No. 60/476,688 filed Jun. 6, 2003, of which both applications are incorporated herein by reference.

FIELD OF THE INVENTION

The present invention relates to a method for improving the thermal efficiency of gas turbine systems by enabling higher firing temperatures without unacceptable NOx production. In particular, the present invention is a method for obtaining low, single-digit NOx emission levels from high turbine-inlet-temperature gas turbines. More particularly, in combined cycle gas turbine systems, the present invention is directed to a method that enables use of higher pressure ratio, higher efficiency gas turbines without sacrificing steam cycle performance thereby providing increased system efficiency.

BACKGROUND OF THE INVENTION

With the present awareness of the importance of improving the efficiency of gas turbine systems in order to reduce fuel costs and also to reduce the emissions of greenhouse gases, there has been a continuing trend to operate such systems at higher turbine inlet temperatures. This results in combustor exit temperatures are exceedingly higher such that a limit is placed on achievable NOx emission levels at the required combustor residence times. Thus, essentially all gas turbine systems typically operating with a turbine inlet temperature greater than about 2200° F., known in the art as "F-Class" machines, even those with dry low NOx combustion systems, now require efficiency robbing after-treatment to achieve NOx emissions less than about 3 ppm. With emissions levels of 2 ppm or lower increasingly being required, there is a disconnect between the need for lower NOx emissions and the need for reduced emissions of greenhouse gases.

It is well known in the art that combined cycle gas turbine-steam turbine systems yield higher efficiencies than either simple cycle gas turbines or stand alone steam turbine power plants, particularly when such combined cycle systems operate with gas turbines exhaust gas temperatures of at least about 1000° F., more typically 1100° F. Use of higher efficiency gas turbines having pressure ratios much greater than 20/1 is usually disadvantageous without increases in turbine inlet temperature to maintain a sufficiently high exhaust temperature. There is therefore a need for gas turbine combustion systems capable of achieving ultra low NOx emissions at the higher required combustor outlet temperatures. Further, because the efficiency of typical high performance gas turbines is reduced at ambient temperatures below the design point, there is a need for a method to allow for improved efficiency at low ambient temperatures.

It has now been found that NOx emissions well below 3 ppm can be achieved even at combustion temperatures above those required for the highest inlet temperature gas turbines now available. By mixing cooled turbine exhaust gases with fresh air, inlet air comprising reduced oxygen content is supplied to the turbine compressor. Advantageously, the temperature of the air supplied to the compressor may be controlled to a predetermined value regardless of how low the ambient air temperature may be, thus allowing the turbine to be operated at maximum efficiency regardless of ambient conditions. If maximum power is required, the inlet air temperature can be reduced at some sacrifice in efficiency.

BRIEF SUMMARY OF THE INVENTION

The present invention is a method and an apparatus for achieving ultra-low NOx combustion emissions, even at the highest combustion temperature required for present gas turbines, comprising the use of exhaust gas recirculation (EGR).

In the present invention the term "air" refers to a gas that contains the oxidizer oxygen. For clarity of the presentation of the invention, the more conventional fuel/air terminology ("fuel/air mixture") will be used, but the invention should not be considered so limited.

The term "equivalence ratio" is used to denote the proportions of fuel and air in the fuel/air mixture. The equivalence ratio is the ratio of the actual fuel/air ratio to the stoichiometric fuel/air ratio, where the stoichiometric coefficients are calculated for the reaction giving full oxidation products $CO_2$ and $H_2O$. An equivalence ratio greater than 1.0 defines a fuel-rich fuel/air mixture, and an equivalence ratio less than 1.0 defines a fuel-lean fuel/air mixture.

As recognized in the art, hydrocarbon fuels have a limited range of fuel/air ratios within which a flame can propagate. The rich flammability limit for combustion is the highest equivalence ratio for flame combustion, and similarly the lean flammability limit is the lowest. As is known, these limits typically widen with an increase in fuel/air mixture temperature or pressure and narrow with reduction in oxygen concentration. Catalytic combustion, as for example using the method of U.S. Pat. No. 6,358,040, unlike conventional flame combustion, is not limited to equivalence ratios within the normal flammability limits of flame combustion and thus is preferred in the method of the present invention.

In the present invention, fresh inlet air is mixed with cooled combustion gases in sufficient quantity to reduce the oxygen content of the resulting mixture, preferably to an oxygen content no more than eighteen mole percent, more preferably about fifteen mole percent or lower. Sufficient oxygen must be present to achieve a mixture with fuel, at the combustor inlet temperature, having the required flame temperature. Advantageously, the combustion products may contain less than one percent residual oxygen. In order to achieve complete combustion of fuel, it is preferred that the combustion comprises a fuel-lean ratio having an equivalence ratio greater than about 0.55 and more preferably greater than about 0.6.

In a preferred method of the present invention, the inlet air is mixed with cooled combustion product gas prior to entering the compressor of a gas turbine. Optionally, the cooled combustion gases may be compressed separately and then mixed with compressed air exiting the gas turbine compressor. After compression, the compressed air mixture is mixed with fuel and combusted thereby producing hot combustion products that are expanded in the turbine to produce power and hot exhaust gas. The exhaust gas is then transported into a heat recovery unit. Typically, the heat recovery unit comprises a steam boiler in which case the steam may be used for heat or further transported into a steam turbine for additional power production. A portion of the cooled combustion product gases from the heat recovery unit, typically at a temperature of about 100 degrees centigrade, may used to dilute the fresh inlet air. This has the advantage of raising the combustor inlet temperature and improving combustion stability. Preferably however, combustion product gases are further cooled such as to a temperature below about 50 degrees centigrade, as for example by passage through a water spray tower or a secondary heat exchanger before being mixed with the fresh air supplied to the compressor.

In order to maximize turbine efficiency, the temperature of the recycled exhaust gas is such that when mixed with the ambient air, the temperature of the admixture supplied to the gas turbine is close to the gas turbine design value. The temperature of the inlet mixture to the compressor can be readily controlled by bypassing a controlled amount of exhausted gas around the secondary chiller. To maximize mass flow through the compressor (and thus maximize power), the temperature the recycled exhaust gas should be as close as feasible to that of the ambient air supplied to the gas turbine or even lower. Advantageously, combustion is stabilized using a catalytic combustor.

It is a significant discovery that stable fuel-lean combustion can be achieved in a gas turbine combustor even with a reduction in oxygen content of the combustion air sufficient to significantly reduce the kinetic rate of NOx formation during fuel-lean combustion.

DETAILED DESCRIPTION OF THE INVENTION

Figure 1:
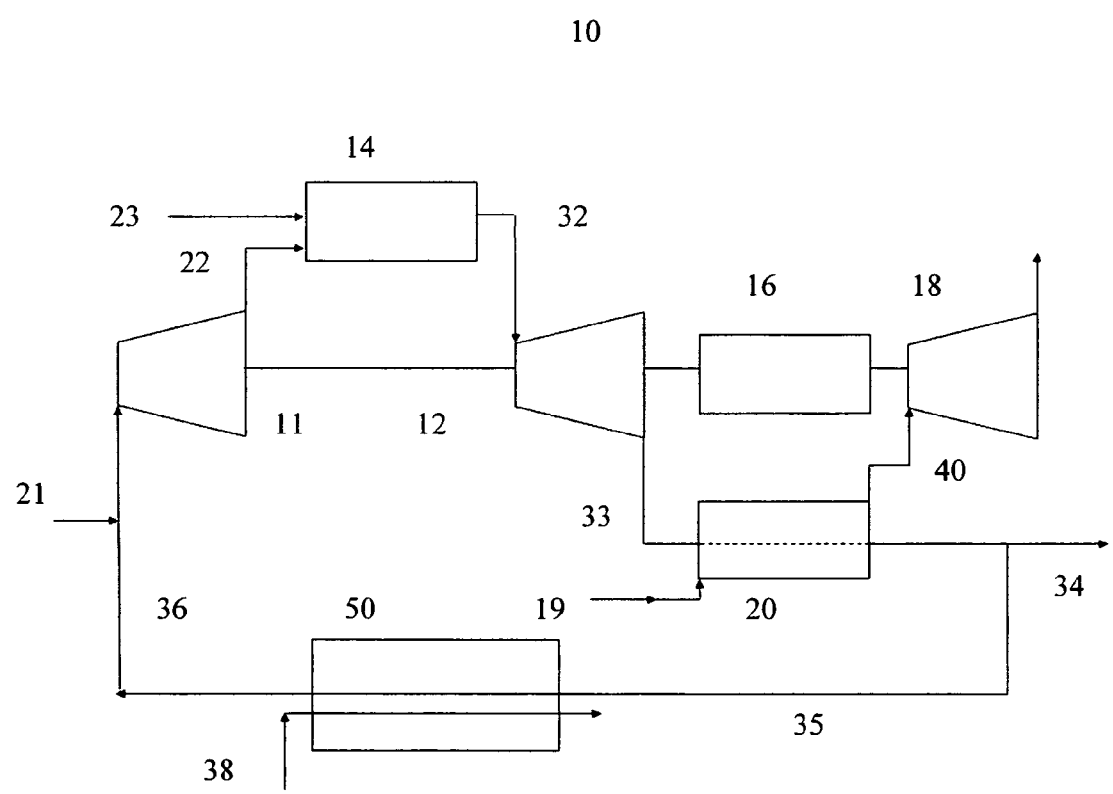
FIG. 1 is a schematic drawing of a typical combined cycle gas turbine system of the present invention.

FIG. 1 depicts a schematic of a typical combined cycle gas turbine system 10 of the present invention. As shown in FIG. 1, combined cycle gas turbine system 10 comprises compressor 11 supplying compressed air to combustor 14 through flow path 22. Fuel enters combustor 14 through flow path 23 wherein it is preferably premixed with the compressed air prior to combustion. Hot combustion products are transported to turbine 12 through flow path 32. Turbine 12 and steam turbine 18 turn and power generator 16. Exhaust gases from turbine 12 are supplied to heat recovery boiler 20 through flow path 33. Water is supplied to heat recovery boiler 20 through flow path 19. The steam produced is supplied to steam turbine 18 through flow path 40. The cooled exhaust gases exit through flow path 34 with a portion being supplied to supplemental cooler 50 through flow path 35 for recycle to the compressor 11 inlet through flow path 36. Cooler 50 comprises a heat exchanger further comprising a coolant 38. Fresh air for combustion is added to the recycled exhaust gases in flow path 36, through flow path 21, and both flows mix prior to entry into compressor 11. Advantageously, combustor 14 is a catalytic combustor, as for example as described in U.S. Pat. No. 6,358,040.

Figure 2:
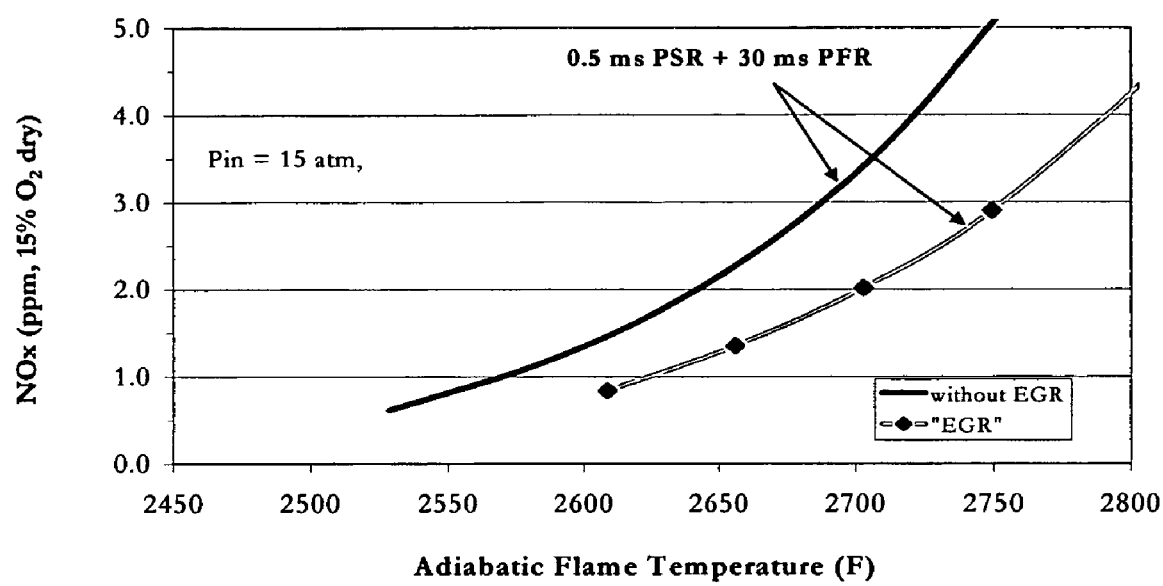
FIGS. 2 and 3 depict respective plots of the calculated NOx emissions for a typical premixed combustion of fuel and air with and without the use of EGR of the present invention.
Figure 3:
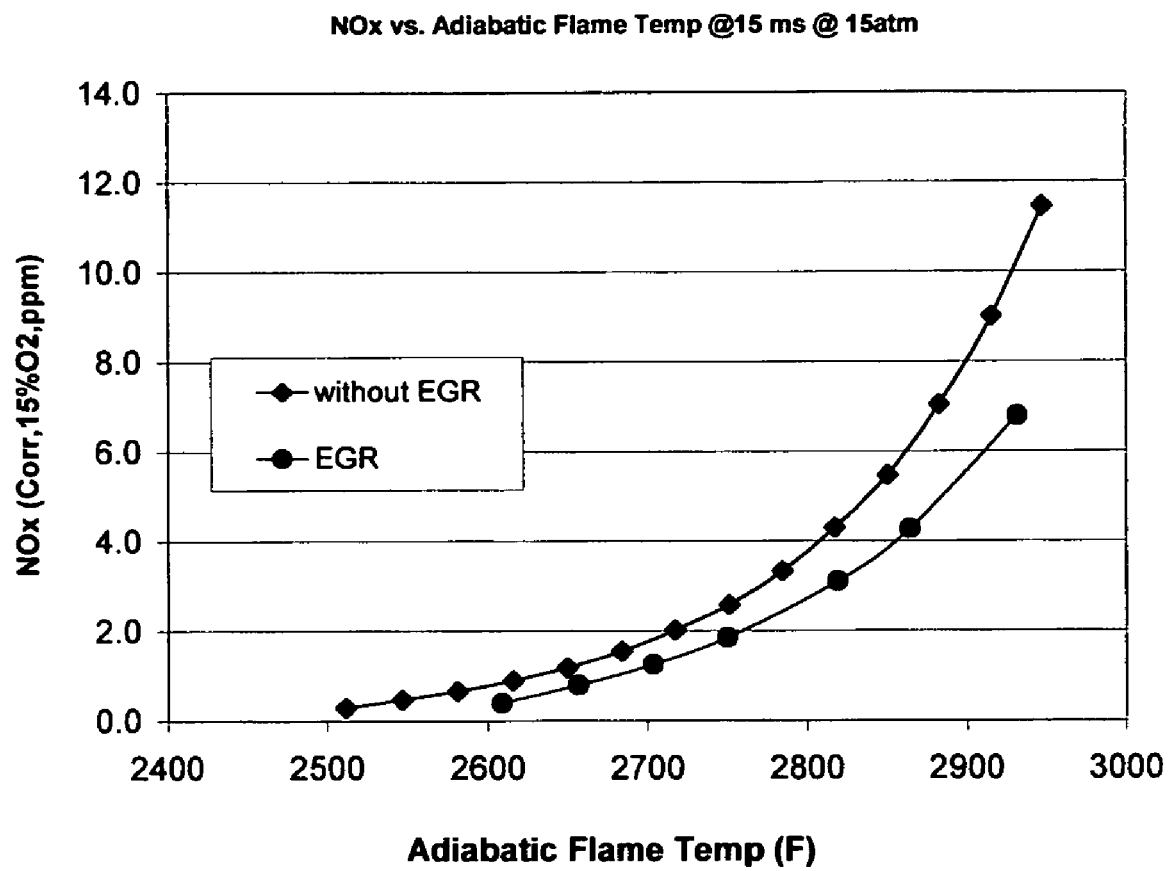

FIG. 2 depicts the calculated NOx emissions for a typical premixed combustion of fuel and air, with and without the use of providing EGR to the inlet fresh combustion air. As shown in FIG. 2, NOx formation at a combustion temperature of 2750° F. is lowered from more than 5 ppm to 3 ppm by use of EGR to lower the oxygen content of the inlet air to 15 percent. Plug flow residence time is thirty milliseconds. Oxygen content can be lowered further resulting in lower NOx emissions. Inlet air oxygen contents as low as about 11 percent are feasible. FIG. 3 depicts the calculated NOx comparison for a similar combustor having a plug flow residence time of only fifteen milliseconds. As shown in FIG. 3, the NOx reduction of EGR applies even for reduced residence time combustors.

Although the present invention has been described in considerable detail with reference to certain preferred versions thereof, other versions are possible. Therefore, the spirit and scope of the invention should not be limited to the description of the preferred versions contained herein.

What is claimed is:

1. A method of lowering the kinetic rate of NOx formation in a gas turbine combustor comprising:
   a) providing a supply of air to a compressor for producing compressed air;
   b) providing a supply of fuel;
   c) passing the compressed air and the fuel to a combustor for combustion;
   d) forming a fuel-air mixture from the compressed air and the fuel prior to combustion in the combustor;
   e) combusting the fuel-air mixture in the combustor and producing hot combustion products;
   f) passing the hot combustion products to a turbine for expanding the hot combustion gases and producing turbine exhaust gases;
   g) passing the turbine exhaust gases to a heat recovery boiler for producing cooled exhaust gases having a temperature less than about 150 degrees Celsius;
   h) passing the cooled exhaust gases to a heat exchanger to produce recycled exhaust gases;
   i) providing a supply of fresh inlet air;
   j) mixing the recycled exhaust gases and the fresh inlet air to form a mixed gas having an oxygen content of no more than eighteen mole percent;
   k) premixing a fuel with the mixed gas prior to passing the mixed gas to the compressor; and
   l) passing the mixed gas to the compressor.

2. A method of lowering the kinetic rate of NOx formation in a gas turbine combustor comprising:
   a) providing a supply of air to a compressor for producing compressed air;
   b) providing a supply of fuel;
   c) passing the compressed air and the fuel to a combustor for combustion wherein the combustor is a catalytic combustor;
   d) forming a fuel-air mixture from the compressed air and the fuel prior to combustion in the combustor;
   e) combusting the fuel-air mixture in the combustor and producing hot combustion products;
   f) passing the hot combustion products to a turbine for expanding the hot combustion gases and producing turbine exhaust gases;
   g) passing the turbine exhaust gases to a heat recovery boiler for producing cooled exhaust gases having a temperature less than about 150 degrees Celsius;
   h) passing the cooled exhaust gases to a heat exchanger to produce recycled exhaust gases;
   i) providing a supply of fresh inlet air;
   j) mixing the recycled exhaust gases and the fresh inlet air to form a mixed gas having an oxygen content of no more than eighteen mole percent; and
   k) passing the mixed gas to the compressor.

3. A method of lowering the kinetic rate of NOx formation in a gas turbine combustor comprising:
   a) providing a supply of air to a compressor for producing compressed air;
   b) providing a supply of fuel;
   c) passing the compressed air and the fuel to a combustor for combustion;

d) forming a fuel-air mixture from the compressed air and the fuel prior to combustion in the combustor;

e) combusting the fuel-air mixture in the combustor and producing hot combustion products;

f) passing the hot combustion products to a turbine for expanding the hot combustion gases and producing turbine exhaust gases;

g) passing the turbine exhaust gases to a heat recovery boiler for producing cooled exhaust gases having a temperature less than about 150 degrees Celsius;

h) passing the cooled exhaust gases to a heat exchanger to produce recycled exhaust gases;

i) providing a supply of fresh inlet air wherein the amount of fresh air supplied is controlled to maintain the oxygen concentration in the hot combustion products below about one percent;

j) mixing the recycled exhaust gases and the fresh inlet air to form a mixed gas having an oxygen content of no more than eighteen mole percent; and k) passing the mixed gas to the compressor.

* * * * *